3,008,873
CONTROLLED PARTICLE SIZE OF
4,4-DINITROCARBANILIDE
Edward F. Rogers, Middletown, N.J., and William J. Leanza, Staten Island, N.Y., assignors to Merck & Co., Inc., Rahway, N.J., a corporation of New Jersey
No Drawing. Filed Feb. 7, 1957, Ser. No. 638,700
8 Claims. (Cl. 167—53)

This invention relates to a novel form of 4,4'-dinitrocarbanilide and to the intermediates produced in the formation of this novel compound. In addition, it relates to feed supplements containing this novel form of 4,4'-dinitrocarbanilide and/or such intermediates.

It has been found that this novel form of 4,4'-dinitrocarbanilide and the novel intermediates produced in accordance with this invention possess marked and effective action in the control and treatment of the disease coccidiosis which infects poultry.

These novel forms of 4,4'-dinitrocarbanilide characterized by having a particle size below one micron are produced by reacting 4,4'-dinitrocarbanilide which may be represented by the following formula:

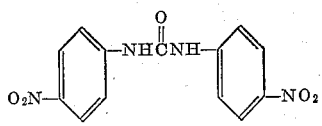

with an alkali metal alkoxide or an alkali metal hydroxide to form a reaction product of 4,4'-dinitrocarbanilide with said alkali metal alkoxide or alkali metal hydroxide. These reaction products may be incorporated directly into animal feedstuffs or alternatively, they may be hydrolyzed and the novel activated 4,4'-dinitrocarbanilide, having an average particle size of below one micron is recovered.

In accordance with procedures for carrying out the process of this invention, 4,4'-dinitrocarbanilide is reacted with an alkali metal alkoxide, an alkali metal hydroxide, or a quaternary ammonium hydroxide, resulting in the formation of the reaction product of 4,4'-dinitrocarbanilide and the alkali metal alkoxide, 4,4'-dinitrocarbanilide and the alkali metal hydroxide, or 4,4'-dinitrocarbanilide and the quaternary ammonium hydroxide. The latter reaction products can then be hydrolyzed and 4,4'-dinitrocarbanilide having a particle size below one micron is recovered by removing the liquid phase.

In the reaction of dinitrocarbanilide with alkalis which are described herein, the particle size of the starting dinitrocarbanilide is not critical. In most of the following examples dinitrocarbanilide having a particle size of approximately 30 microns was used but similar results are obtainable with dinitrocarbanilide of appreciably smaller or larger particle sizes, for example 5 or 100 microns. The term "dinitrocarbanilide," unless otherwise stated, will indicate dinitrocarbanilide as obtained by usual synthetic methods and routine operations of crystallization or precipitation with or without grinding.

The alkalis which may be employed in this process include the strong alkalis such as the alkoxides and hydroxides of alkali metals, alkaline earth metals and quaternary ammoniums. Some of the specific strong alkalis are sodium and potassium methoxides, ethoxides and t-butoxides, sodium and potassium hydroxides, tetramethyl ammonium hydroxide and benzyltrimethylammonium hydroxide.

Although the reaction may be carried out in the absence of a solvent, it has been found that the reaction between the ingredients is facilitated by carrying out the reaction in the presence of a solvent. The solvents which may be employed include water miscible alcohols, ethers and ketones. Such solvents include for example, methyl, ethyl, or propyl alcohol, acetone, tetrahydrofuran and dioxane. The solvent employed in the reaction may be varied with the alkali metal alkoxide or hydroxide to be employed for optimum results. In the reaction of 4,4'-dinitrocarbanilide with an alkali metal alkoxide, the preferred medium employed in the reaction is the corresponding alcohol. Where the 4,4'-dinitrocarbanilide is to be reacted with an alkali metal hydroxide, the medium of the reaction is any of the above solvents, but preferably acetone.

The reaction product of 4,4'-dinitrocarbanilide and the alkali metal alkoxide, or the reaction product 4,4'-dinitrocarbanilide and the alkali metal hydroxide or the reaction product of 4,4'-dinitrocarbanilide and the quaternary ammonium hydroxide may be incorporated in a feedstuff and has been found to be active against the disease coccidiosis, which infects poultry.

It has also been found that when these reaction products of 4,4'-dinitrocarbanilide with an alkali metal alkoxide, an alkali metal hydroxide or a quaternary ammonium hydroxide are hydrolyzed the 4,4'-dinitrocarbanilide recovered has a particle size of below one micron. The present invention provides a 4,4'-dinitrocarbanilide of a particle size of below one micron, which has never before been produced. The 4,4'-dinitrocarbanilide having a particle size of below one micron has approximately five times the activity of the 4,4'-dinitrocarbanilide of ordinary particle size when administered to fowl for the treatment of coccidiosis, which is more fully described hereinafter.

The reaction products of 4,4'-dinitrocarbanilide and alkali metal alkoxides, alkali metal hydroxides or quaternary ammonium hydroxides, and 4,4'-dinitrocarbanilide having a particle size of below one micron, are active against the widespread poultry disease commonly called coccidiosis, which is caused by species of protozoan parasites of the genus Eimeria. In this regard, E. tenella is responsible for a severe and frequently fatal infection of the caecum of chickens. Furthermore, other serious infections are caused in fowl by other species of Eimeria and especially E. acervulina, E. necatrix, E. maxima, and E. brunetti. If left untreated, such infections often cause extensive losses of fowl. The elimination or control of coccidiosis is, therefore, of the utmost importance for successful poultry raising.

These novel compositions, useful in the treatment of coccidiosis, contain as the active ingredient the reaction product of 4,4'-dinitrocarbanilide and an alkoxide or hydroxide of an alkali metal, an alkali earth metal, a quaternary ammonium hydroxide, or 4,4'-dinitrocarbanilide having a particle size of below one micron. These compositions comprise the active ingredient intimately combined with an inert carrier or diluent. Such compositions are conveniently produced by intimately dispersing the active ingredient throughout a carrier. The carrier or diluent may be either liquid or solid. Liquid dispersions can be prepared satisfactorily by using emulsifiers and surface active agents. Any solid can be used as a carrier which is inert toward the active compounds and which can be administered to animals with safety. Examples of suitable carriers are ground oyster shells, Attapulgus clay, and edible vegetable materials such as commercial animal and poultry feeds, urea, corn meal, ground corn, citrus meal, fermentation residues and distillers' dried grains. The active ingredient is conveniently dispersed in a solid carrier by conventional methods such a stirring, tumbling, and grinding. In this manner, by selecting different carriers and by altering the ratio of carrier to active ingredient, compositions of varying concentration can be prepared. Compositions very suitable for addition to poultry feed may contain from about 1% to about 25% of the new coccidiostat, and preferably about 3% to 10%, adsorbed on or mixed with a carrier.

The amount of active ingredient required for effective prophylactic control of coccidiosis is very low. With regard to poultry, good results have been obtained by the administration of a quantity of the active ingredient equal to about 0.01% to 0.1% of the food consumed. Optimum results are usually obtained by the daily administration of a quantity of active ingredient equal to about 0.02% to about 0.05% of the food consumed. Such relatively small amounts may be conveniently incorporated in the normal ration prior to feeding the poultry. Larger concentrations of up to about 0.2% of the active ingredient may be employed if an outbreak of the disease is encountered.

The coccidiostatic activity of compositions containing a reaction product of 4,4'-dinitrocarbanilide and an alkoxide or hydroxide of an alkali metal, an alkaline earth metal, a quaternary ammonium hydroxide, 4,4'-dinitrocarbanilide having a particle size of below one micron and ordinary 4,4'-dinitrocarbanilide, was experimentally demonstrated according to the following test:

Groups of 10 two-week-old chicks were fed a mash feed containing 0.025% of the active ingredient uniformly dispersed therein. After existing on the diet for 24 hours, each chick was inoculated with 50,000 sporulated oöcyst of *E. tenella*. In addition, groups of 10 chicks were also infected but fed a diet free of the active ingredient and used as positive controls. The experiment was terminated after administering the respective diets for seven days after inoculation and the results reported in the following Table I were obtained. The oöcyst count (number of parasites of *E. tenella* remaining) was determined by sacrificing the birds and examining the infected organs microscopically.

Example 2
THE REACTION PRODUCT OF ONE MOLE OF 4,4'-DINITROCARBANILIDE AND TWO MOLES OF POTASSIUM HYDROXIDE A mixture of 30 g. (0.1 mole) of 4,4'-dinitrocarbanilide and 13.2 g. (0.2 mole) of 85% potassium hydroxide was ground in a mortar with the gradual addition of 25 ml. of acetone containing 2 g. of a polyoxyalkylene derivative of sorbitan monooleate. The black powder finally obtained after drying weighed 42 g.

PREPARATION OF 4,4'-DINITROCARBANILIDE HAVING A PARTICLE SIZE BELOW ONE MICRON

Into 400 ml. of water was poured with stirring 15 g. of the reaction product of one mole of 4,4'-dinitrocarbanilide and two moles of potassium hydroxide, prepared as described above. After one hour the yellow precipitate was collected, washed with water and air dried. The yellow 4,4'-dinitrocarbanilide thus obtained had a particle size below one micron.

Example 3
THE REACTION PRODUCT OF ONE MOLE OF 4,4'-DINITROCARBANILIDE AND ONE MOLE OF SODIUM METHOXIDE To a solution of 0.92 g. of sodium (0.04 mole) in 200 ml. of methanol was added 12.2 g. (0.04 mole) of 4,4'-dinitrocarbanilide. The mixture was stirred for three hours at room temperature and then concentrated in vacuo to dryness. The product containing equimolar quantities of 4,4'-dinitrocarbanilide and sodium methoxide slowly turned purplish-black as it dried.

Example 4
PREPARATION OF 4,4'-DINITROCARBANILIDE HAVING A PARTICLE SIZE BELOW ONE MICRON Into 500 ml. of water was poured with stirring 16 g.

TABLE I.—ANTICOCCIDIAL TESTING RESULTS

| Compound Used | Percent Compound in Diet | Percent Mortality | | Oocyst Count×10⁻⁶ | | Percent Weight Gain | |
|---|---|---|---|---|---|---|---|
| | | Treated | Untreated | Treated | Untreated | Treated | Untreated |
| The Reaction Product of one mole of 4,4'-dinitrocarbanilide and two moles of sodium hydroxide | 0.025 | 0 | 23 | 0.3 | 17.0 | 48 | 9 |
| The Reaction Product of one mole of 4,4'-dinitrocarbanilide and one mole of sodium methoxide | 0.025 | 0 | 16 | <0.1 | 16.7 | 47 | 25 |
| The Reaction Product of one mole of 4,4'-dinitrocarbanilide and two moles of potassium hydroxide | 0.025 | 0 | 23 | 1.3 | 16.2 | 65 | 27 |
| The Reaction Product of two moles of 4,4'-dinitrocarbanilide and one mole of tetramethylammonium hydroxide | 0.025 | 0 | 23 | 0.4 | 17.0 | 51 | 9 |
| The Reaction Product of one mole of 4,4'-dinitrocarbanilide and one mole of benzyltrimethylammonium hydroxide | 0.025 | 0 | 17 | 0.9 | 22.4 | 53 | 26 |
| 4,4'-Dinitrocarbanilide (below one micron) | 0.025 | 0 | 13 | 0.7 | 29.9 | 41 | 15 |
| 4,4'-Dinitrocarbanilide (3 to 5 microns) | 0.025 | 10 | 23 | 13 | 15 | 27 | 11 |

It will be noted from Table I that while 4,4'-dinitrocarbanilide having a particle size of from 3 to 5 microns when administered to chicks does have activity, such activity does not approach that displayed by 4,4'-dinitrocarbanilide having a particle size below one micron.

The following examples are intended to be illustrative only and may be varied or modified without departing from the spirit and scope of this invention:

Example 1
THE REACTION PRODUCT OF ONE MOLE OF 4,4'-DINITROBARBANILIDE WITH ONE MOLE OF POTASSIUM HYDROXIDE A mixture of 3 g. (0.01 mole) of 4,4'-dinitrocarbanilide, 2.5 ml. of 4 N potassium hydroxide and 90 ml. of acetone was stirred together giving red crystals of the salt. These were dissolved by warming and reprecipitated by evaporation of the solution under vacuum. The light red crystals darkened on drying in vacuum.

of the reaction product of one mole of 4,4'-dinitrocarbanilide and one mole of sodium methoxide prepared as described above. After one half hour the precipitate was collected, washed with water and air dried, yielding 14 g. of 4,4'-dinitrocarbanilide having a particle size below one micron.

*Analysis.*—Calcd. for $C_{13}H_{10}N_4O_5$ (4,4'-dinitrocarbanilide): C, 51.66; H, 3.34; N, 18.47. Found: C, 51.70; H, 3.31; N, 18.65.

Example 5
THE REACTION PRODUCT OF ONE MOLE OF 4,4'-DINITROCARBANILIDE WITH TWO MOLES OF SODIUM HYDROXIDE A mixture of 30 g. (0.1 mole) of 4,4'-dinitrocarbanilide and 8 g. of powdered sodium hydroxide was ground in a mortar with the addition of a small amount of acetone, giving a bright red powder.

Example 6

THE REACTION PRODUCT OF 4,4'-DINITROCARBANILIDE AND TETRAMETHYLAMMONIUM HYDROXIDE

A mixture of 30 g. of 4,4'-dinitrocarbanilide and 100 ml. of 10% aqueous tetramethylammonium hydroxide in 200 ml. of acetone was prepared. The bright orange solid was collected, washed with a small quantity of ethanol and dried. Titration showed this product contained two moles of 4,4'-dinitrocarbanilide and one mole of tetramethylammonium hydroxide.

Example 7

THE REACTION PRODUCT OF 4,4'-DINITROCARBANILIDE AND BENZYLTRIMETHYLAMMONIUM HYDROXIDE

Benzyltrimethylammonium hydroxide (150 ml. of 40% aqueous solution) was added to a suspension of 75 g. of 4,4'-dinitrocarbanilide in 600 ml. of acetone. After several minutes stirring, the solution was filtered from a trace of undissolved material. A crude product of one mole of 4,4'-dinitrocarbanilide and one mole of benzyltrimethylammonium hydroxide was precipitated by treating the filtrate with 400 ml. of ether.

The compound was purified by solution in 400 ml. of acetone, decantation from a lower, dark-brown, oily layer, then precipitation with 200 ml. of ether. The yellow precipitate was dried in vacuo to a constant weight of 48 g. During this process the color changes from yellow to orange. An acid titration indicated an equivalent weight of 485±20 against a calculated weight of 451.

Various changes and modifications may be made in carrying out the present invention without departing from the spirit and scope thereof. Insofar as these changes and modifications are within the purview of the annexed claims they are to be considered as part of this invention.

We claim:
1. The process which comprises bringing 4,4'-dinitrocarbanilide into reactive contact with a compound selected from the group consisting of alkali metal alkoxide, alkali metal hydroxide and quaternary ammonium hydroxide, to form the addition product of said 4,4'-dinitrocarbanilide and said compound, bringing said addition product into intimate contact with water until 4,4'-dinitrocarbanilide is regenerated from said addition product, and removing the liquid phase from said regenerated 4,4'-dinitrocarbanilide, whereby said regenerated 4,4'-dinitrocarbanilide is recovered in a form in which its average particle size is below one micron.

2. The process of claim 1, wherein potassium hydroxide is the compound employed, and equimolecular amounts of potassium hydroxide and 4,4'-dinitrocarbanilide are used.

3. The process of claim 1, wherein potassium hydroxide is the compound employed, and one mole of 4,4'-dinitrocarbanilide per two moles of said compound are used.

4. The process of claim 1, wherein sodium methoxide is the compound employed, and equimolecular amounts of said compound and 4,4'-dinitrocarbanilide are used.

5. The process of claim 1, wherein sodium hydroxide is the compound employed and equimolecular amounts of said compound and 4,4'-dinitrocarbanilide are used.

6. The process of claim 1, wherein sodium hydroxide is the compound employed, and one mole of 4,4'-dinitrocarbanilide per two moles of said compound are used.

7. The process of claim 1, wherein tetramethylammonium hydroxide is the compound employed.

8. The process of claim 1, wherein benzyltrimethylammonium hydroxide is the compound employed and equimolecular amounts of said compound and 4,4'-dinitrocarbanilide are used.

References Cited in the file of this patent
UNITED STATES PATENTS

| | | |
|---|---|---|
| 2,823,162 | O'Neill | Feb. 11, 1958 |
| 2,850,530 | O'Neill | Sept. 2, 1958 |
| 2,879,201 | Van Essen | Mar. 24, 1959 |

OTHER REFERENCES

Beilstein Handbuch—Band 12, 1929, page 723.

Kogan: J. General Chemistry, U.S.S.R., vol. 21, No. 11, November 1951, pp. 2259, 2260, 2262, and 2263.

Clinical and Experimental Use of Sulfanilamide, 1938, p. 18.